United States Patent

Bafford et al.

[19]

[11] Patent Number: 5,948,546

[45] Date of Patent: Sep. 7, 1999

[54] FLEXIBLE LAMINATES BONDED WITH WATER-BASED LAMINATING VEHICLES AND LAMINATING ADHESIVES

[75] Inventors: Richard Anthony Bafford, Macungie; Patrick N. Murphy, Fogelsville, both of Pa.

[73] Assignee: Air Products and Chemicals, Inc., Allentown, Pa.

[21] Appl. No.: 08/730,534

[22] Filed: Oct. 11, 1996

[51] Int. Cl.$^6$ ................................................. B32B 27/00
[52] U.S. Cl. ........................ 428/500; 428/507; 428/515; 428/520; 428/476.3; 428/483; 156/326; 156/331.2; 156/331.6; 523/411; 524/501; 524/555
[58] Field of Search ................... 428/500, 507, 428/515, 520, 476.3, 483; 156/326, 331.2, 331.6; 523/411, 412; 524/501, 555

[56] References Cited

U.S. PATENT DOCUMENTS

| | | | |
|---|---|---|---|
| 3,033,707 | 5/1962 | Lacy et al. | 428/215 |
| 3,404,114 | 10/1968 | Snyder | 524/87 |
| 3,625,795 | 12/1971 | Knechtges et al. | 156/241 |
| 4,132,831 | 1/1979 | Dickert | 428/458 |
| 4,483,712 | 11/1984 | Murphy et al. | 106/31.4 |
| 5,037,700 | 8/1991 | Davis | 428/414 |

*Primary Examiner*—Leszek Kiliman
*Attorney, Agent, or Firm*—Russell L. Brewer

[57] ABSTRACT

This invention relates to improved flexible laminates formed from at least one corona treated polyolefin or polyester film bonded to another polymeric or cellulosic film via an aqueous based laminating ink. The improvement in the flexible laminates resides in the aqueous based emulsion used to print and bond the respective films. The aqueous based emulsion is comprised of an acrylic interpolymer prepared by emulsion polymerizing alkyl(meth)acrylates, $\alpha,\beta$-unsaturated olefins, such as styrene and suitably substituted styrenes, and/or $\alpha,\beta$-unsaturated nitrites, such as acrylonitrile, with an amino(meth)acrylate, an amino (meth) acrylate or vinyl amine.

18 Claims, No Drawings

FLEXIBLE LAMINATES BONDED WITH WATER-BASED LAMINATING VEHICLES AND LAMINATING ADHESIVES

TECHNICAL FIELD OF THE INVENTION

This invention relates to flexible laminates formed from polymeric films bonded with a laminating ink formulated with a laminating ink letdown vehicle.

BACKGROUND OF THE INVENTION

Laminating adhesives and/or laminating vehicles or laminating ink vehicles, depending upon the specific nomenclature of the industry, are used in the preparation and/or printing via laminating inks containing the laminating ink vehicles of multi-layer flexible packaging formed from thin polymeric films. A major application market for such flexible packaging is in the packaging of snack foods such as potato chips, pretzels, etc. A construction of a flexible package, for example, consists of an oriented polypropylene (OPP) film which has been laminated with a laminating adhesive with at least one other polymeric film. A different construction for preparing a potato chip package involves extruding molten polyethylene from a die into a nip between a printed film and a second film, such as OPP. Ink coverage can be as high as 100% or greater with multiple layers. An alternative construction consists of a metallized polyethylene terephthalate (PET) base film, an extruded polyethylene (PE), and a reverse printed OPP.

Environmental regulations are driving the industry to water based systems. Water-borne flexo inks are now the major inks used for printing of paper and linerboard. Waterborne inks for printing flexible films, such as oriented polypropylene (OPP), polyethylene, polyethylene terephthalate, and polyvinyl chloride (PVC) have been developed but they have failed to meet the requirements of a good laminating vehicle which include good printability and good bonding to the printed film and yet function as to bond to the laminating extrudate.

Representative literature regarding laminating inks and laminating adhesives as follows:

U.S. Pat. No. 3,033,707 discloses film and foil packaging articles formed by laminating polymeric films, particularly saran-coated regenerated cellulose as well as polyolefins to provide flexible, vapor-proof materials. The adhesive used in bonding the films are based upon polyalkylene imines dispersed within an organic solvent.

U.S. Pat. No. 3,404,114 discloses latexes having adhesion and freeze stability which are suited for use as adhesives for the coatings industry. The latexes comprise from about 1 to 25% of an unsaturated carboxylic acid, from about 50 to 98% of vinylidene monomers or alkyl acrylates and from about 1 to 25% of alkyl amino-alkyl esters of acrylic and methacrylic acid. One of the latex recipes discloses emulsion polymers comprising about 65% ethylacrylate, 31% methyl methacrylate, 1.5% of acrylic and methacrylic acid, and 3% tertiary butylaminoethyl acrylate.

U.S. Pat. No. 3,625,795 discloses a process for depositing an adhesive and for bonding laminates resistant to delamination by spraying an aqueous polymeric latex containing carboxyl functionality onto the material, and the latex droplets deposited as discrete raised spots rather than a continuous film. A wide variety of monomers can be used in preparing the latex which includes lower alkyl esters of acrylic and methacrylic acid, a variety of comonomers, which include conjugated dienes, vinyl halides, vinyl esters, such as vinyl acetate, N-alkylol amides, e.g., N-methylol acrylamide, and other amides. An example shows a latex formed from ethyl acrylate, 2-ethylhexyl acrylate, N-methylol acrylamide, acrylamide, methacrylic acid, and methylene bisacrylamide. The emulsion when applied as discrete droplets impart improved peel strengths to laminates.

U.S. Pat. No. 4,132,831 discloses laminates prepared by a process comprising the addition of a binding amount of a linear, acylated polyalkylenepolyamine. An example shows the application of an aqueous solution of a poly(N-propionyl)ethylenimine to a bleached Kraft paper. Polyethylene film then is applied to the poly(N-propionyl) ethylenimine coated paper and passed through a cold roller. Excellent adhesion had been obtained with this particular acylated polyethyleneimine adhesive.

U.S. Pat. No. 4,483,712 discloses water-borne laminating inks which are printed onto plastic films and subsequently laminated to another plastic film. The ink comprises a binder comprising shellac or copol, water, a lower alcohol, a base, a water-reducible titanium ester chelate and a colorant. The ink is especially suitable for printing on polyolefin films, particularly oriented polypropylene film which has been corona treated.

U.S. Pat. No. 5,037,700 discloses curable, water-borne laminating adhesive. The adhesives suited for producing woven and nonwoven fabrics, oriented and non-oriented polyethylene and polypropylene films, metallic foils and metallized films for use in flexible packaging, graphic arts, etc. A component of the adhesive comprises at least 60% by weight of an alkyl acrylate or methacrylate, 1 to 10% by weight of unsaturated carboxylic acid, and 0 to 39% of a hydroxyalkyl acrylate or methacrylate in methylol acrylamide and a nitrogen-containing monomer such as acrylonitrile, allyl carbamate or an alkylated allyl carbamate.

SUMMARY OF THE INVENTION

This invention relates to improved flexible laminates formed from at least one corona treated polymeric film, e.g., a polyolefin or polyester film bonded to at least one other metallized, polymeric or cellulosic film via an aqueous based laminating vehicle. The improvement in the flexible laminates resides in the aqueous based laminating vehicle emulsion used to bond the respective films. The aqueous based laminating vehicle emulsion is comprised of an acrylic interpolymer having polymerized units of (meth) acrylates in combination with an amino(meth)acrylate, an amino(meth)acrylamide and/or a vinyl amine such as 4-vinyl pyridine. Often $\alpha,\beta$-unsaturated olefins, such as styrene and suitably substituted styrenes, esters of vinyl alcohol such as vinyl acetate, and/or $\alpha,\beta$-unsaturated nitriles, such as acrylonitrile are included in the interpolymer. The invention also relates to the aqueous emulsion based laminating emulsions which have been formed in the presence of a resin stabilizer system.

There are significant advantages associated with the flexible laminates bonded with the interpolymer emulsions, and particularly the resin stabilized emulsions, described herein and these include:

an ability to form flexible laminates from polyolefin, polyester, or metallized polyester films having strong bonds to a second polymeric film polyolefin, polyester, metallized polyester film or other metallized film laminated to said printed film;

an ability to form ink formulations from the laminating vehicles which have essentially no volatile organic components therein, thereby rendering the ink formulations environmentally friendly;

an ability to form flexible laminates utilizing an aqueous emulsion which possesses desirable rheological properties; and, an ability to form pigmented dispersions to yield laminating inks with excellent binding properties suitable for printing by processes such as flexography, gravure and offset gravure.

DETAILED DESCRIPTION OF THE INVENTION

The flexible laminates generated in accordance with this invention are those formed from thin polymeric films primarily of polyethylene, polypropylene, polyvinyl chloride, polyvinylidene chloride as well as polyesters, such as polyethylene terephthalate, cellulose, and polyamides. Metallized films may also be employed; aluminum being the preferred metal. The films from these polymers typically have a thickness ranging from about 0.5 to 2 mil. In the formation of the flexible laminates, polymeric films having barrier providing characteristics are bonded to other polymeric surfaces, paper, or metallic foils such as aluminum foil to produce a flexible package. Typical flexible laminates of the type contemplated herein are formed from thin films of corona treated polypropylene or polyethylene bonded to thin films of polyester, polyamide, or polyvinylidene chloride coated with cellophane or polyvinylidene chloride.

A key to preparing flexible laminates for the packaging of foodstuffs having enhanced properties with regard to printability and enhanced resistance to delamination are based upon the utilization of an aqueous laminating vehicle emulsion formed from a combination of hydrophobic monomers and an amine selected from the group consisting of an amino acrylate or amino methacrylate, an amino acrylamide or amino methacrylamide and vinyl pyridine. For reasons of efficiency, the discussion to follow may simply refer to the class as amino(meth)acrylates.

A wide variety of co-monomers can be polymerized with the amino(meth)acrylate. Suitable monomers include $C_{1-12}$ alkyl esters of (meth)acrylic acid, styrene, α-methylstyrene, alkyl substituted styrenes, such as o-methyl-styrene and p or t-butylstyrene, esters of vinyl alcohol such as vinyl acetate, vinyl propionate and (meth)acrylonitrile. Monomer selection should take into account the functional nature of the aminoacrylate and therefore monomers having groups reactive with the amine should be used with caution. Acrylic acid, for example, when polymerized into the copolymer can detract from the laminating vehicle properties of the copolymer.

The selection of the co-monomers is dictated by the end use application of the laminating ink vehicle. The Tg of the copolymer typically is within the range of −50 to +60° C. For packaging of frozen foods, a low $T_g$ polymer (−20 to +10 C.) is preferred so that the printed ink film does not become brittle. For packaged foods stored at ambient temperature, a higher $T_g$ polymer (50° C.) can be used.

Polymerizable monomers which are employed in the synthesis of the aqueous laminating adhesive and laminating vehicle emulsions include alkyl esters of acrylic or methacrylic acid having an alkyl ester portion containing between 1 to 12 carbon atoms. Examples of acrylates and methacrylates conventionally employed in forming laminating adhesives or laminating vehicles include, ethyl methacrylate, butyl acrylate, butyl methacrylate, propyl methacrylate, 2-ethylhexyl acrylate, as well as styrene, alphamethyl styrene, and ethylene, acrylonitrile, maleate esters such as ethyl maleate and mixtures of the same. Preferred monomers include the methacrylates such as methyl methacrylate.

Amino acrylates and methacrylates which are used in forming the polymer component of the latex include secondary or tertiary aminoacrylate monomers. Representative amine monomers include diethylaminoethyl acrylate, diethylaminoethyl methacrylate, 2-(dimethylamino)ethyl acrylate (DMAEA), 2-(dimethylamino)ethyl methacrylate (DMAEMA), 2-aminoethyl acrylate, 2-aminoethyl methacrylate, 2-methylaminoethyl acrylate and 2-methylaminoethyl methacrylate, 2-(diethylamino)ethyl acrylate (DEAEA), 2-(diethylamino)ethyl methacrylate (DEAEMA), 3-aminopropyl acrylate and 3-aminopropyl methacrylate, dimethylaminopropyl acrylate and dimethylaminopropyl methacrylate, tertiary butylaminoethyl acrylate, tertiary butylaminoethyl methacrylate (tBAEMA), 2-N-morpholinoethyl methacrylate, 2-N-morpholinoethyl acrylate, and amino(meth)acrylamides, which are amide counterparts to the amino(meth)acrylates, and include amino methacrylamides such as N-3-(dimethylamino)propyl methacrylamide and N-3-(diethylamino)propyl acrylamide.

Still another class of suitable amino acrylate monomers consist of the amine adducts of glycidyl methacrylate or glycidyl acrylate. These represent the addition product of the glycidyl methacrylate and glycidyl acrylate and a host of secondary amines. Typical hydroxy amino acrylate monomers include 3-dimethylamino-2-hydroxypropyl methacrylate, 3-diethylamino-2-hydroxypropyl methacrylate, 3-t-butylamino-2-hydroxypropyl methacrylate, 3-t-butylamino-2-hydroxypropyl acrylate, 3-N-morpholino-2-hydroxypropyl methacrylate, 3-(2'-N'-morpholinoethyl)amino-2-hydroxypropyl methacrylate, 3-dibutylamino-2-hydroxypropyl methacrylate, 3-N-piperidino-2-hydroxypropyl methacrylate, 3-[2-(N,N-dimethylamino)ethylamino]-2-hydroxypropyl methacrylate, and 3-[3-(N,N-dimethylamino)propylamino]-2-hydroxypropyl methacrylate. For purposes of this application, amino acrylate monomers also refers to laminating vehicle emulsions which are post treated with an amine to form the hydroxypropyl(meth)acrylates and thus the resultant acrylic polymer formed by the post treatment is deemed to contain polymerized units of an amino acrylate.

Other amine monomers which may be used in combination with or in place of the amino acrylates or amino(meth) acrylamides include pyridines such as 4-vinyl pyridine and 2-vinyl pyridine.

The amine monomer, e.g., the amino(meth)acrylate content of the polymer can range from about 3 to 50%, preferably from about 8 to 30% by weight. The film to film bond strength is proportional to the amino(meth)acrylate content of the polymer and therefore a higher level of amine (>4% and generally >8%) in the form of the amino acrylate is preferred. The amount of amino(meth)acrylate in the polymer will depend on the film to film bond strength desired, however; because of the cost of these amino(meth) acrylates and the observation that high levels of amino (meth)acrylate often can lead to excessive coagulum and reactor fouling, the minimum effective level should be used.

(a) acrylate/methacrylate      40 to 65%, preferably 50 to 65% by weight
(b) styrene/α-methylstyrene      0 to 50% preferably 5 to 25% by weight
(c) amino acrylates      3 to 50% preferably 8 to 30% by weight Emulsion polymerization of ethylenically unsaturated monomers to produce polymer dispersions is well known and conventional emulsion polymerization processes can be used to form the copolymers incorporating the amino acrylate functionality. The emulsion polymerization process may be a batch process which involves a homogenization period in which a portion of the monomer is suspended in water and is thoroughly agitated in the presence of a comonomer while the system is gradually heated to polymerization temperature. The homogenization period is followed by a polymerization period during which the initiator system, which consists of generally of a peroxide and an activator, (as described in the literature), which are added incrementally. Alternatively, the emulsion polymerization process can rely on incremental addition of the monomers in order to produce a copolymer having a desirable distribution of the comonomers. In that case, water and the stabilizing system are added to the reactor with the monomers being added incrementally (delay addition) over time. The catalyst system comprising the oxidizing agent and reducing agent or thermal initiator are added to maintain a preselected reaction rate.

A wide variety of emulsifying agents can be used in generating the stabilizing system for effecting emulsion polymerization of the monomer systems. In the preparation of the laminating vehicles, conventional surfactant stabilized emulsions, resin stabilized and amino acrylate oligomer stabilized systems may be employed in the emulsion polymerization process. In surfactant stabilized emulsions, suitable non-ionic emulsifying agents include polyoxyethylene condensates. Polyoxyethylene condensates may be represented by the general formula:

$$R(CH_2-CH_2-O)_nH$$

where R is the residue of a fatty alcohol containing 10–18 carbon atoms, an alkyl phenol, a fatty acid containing 10–18 carbon atoms, an amide, an amine, or a mercaptan, and where n is an integer of 1 to 50 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thioether.

One class of non-ionic emulsifying agents which can be used include a series of surface active agents known as "Pluronics." The "Pluronics" have the general formula:

$$HO(C_2H_4O)_a(C_3H_6O)_b(C_2H_4O)_cH$$

where a, b, and c are integers of 1 or above. As b increases, the compounds become less water soluble or more oil soluble and thus more hydrophobic when a and c remain substantially constant.

Some examples of nonionic emulsifying agents sold under the Pluronic trademark which can be used include polyoxyethylene-polyoxypropylene glycols conforming to the above general formula for "Pluronics" in which the polyoxypropylene chain has a molecular weight of 1500 to 1800 and the polyoxyethylene content is from 40 to 50 percent of the total weight of the molecule, a polyoxypropylene having a cloud point of about 140° F. and marketed under the trademark "Pluronic L-64"; a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule and having a cloud point of about 212° F. and marketed under the trade mark "Pluronic F-68". "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

Another class of nonionic surfactants are sold under the Igepal trademark. One example within this class is a polyoxyethylene nonylphenyl ether having a cloud point of between 126 and 133° F. and marketed under the trade mark "Igepal CO-630"; another is polyoxyethylene nonylphenyl ether having a cloud point above 212° F. and marketed under the trade mark "Igepal CO-887." A similar polyoxyethylene nonylphenyl ether with a cloud point of about 86° F. is marketed under the trade mark "Igepal CO-610." Surfactants similar to the Igepal surfactants include a polyoxyethylene octylphenyl ether having a cloud point of between 80° F. and 160° F. marketed under the trademark "Triton X-100", a polyoxyethylene oleyl ether having a cloud point of between 80° F. and 160° F. marketed under the trade mark "Atlas G-3915" and a polyoxyethylene lauryl ether having a cloud point above 190° F. marketed under the trademark "Brij 35."

Anionic surfactants have also been widely use to produce the polymer systems for the coating compositions and can be used in producing the polymer dispersions. Representative anionic surfactants include alkali metal alkyl sulfates such as sodium lauryl sulfate, and the ammonium or sodium salt of a sulfate or phosphate ester of an alkylphenoxy poly (ethyleneoxy)ethanol, where the oxyethylene content is from 3 to 40 moles per alkylphenol, complex organic phosphates (sold under the trademark GAFAC), alkylaryl sulfonates such as sodium dodecylbenzene sulfonate, sodium dodecyldiphenyl ether disulfonate and so forth.

Resin stabilized systems may be used to stabilize the laminating ink vehicle emulsion. Such stabilizers are known and typically comprise low molecular weight, compatible polymers having carboxyl functionality. This functionality then is converted to an ammonium salt by addition of ammonia. Resin fortified latexes are stabilized, in the absence or presence of surfactants. One example of a resin fortifying system is an aqueous solution of a salt of a carboxylated styrene, low molecular weight polymer. A typical commercially used resin is Vancryl™ 65, a terpolymer of acrylic acid, styrene, and α-methyl styrene, manufactured by Air Products & Chemicals, Inc., and having a $M_n$ of 2,700 and a $M_w$ of 7,400.

There are two major reasons why resin fortified or stabilized latexes are preferred: (a) they confer on the latex more Newtonian rheology than surfactant stabilized latexes and (b) they confer on the printing ink "resolubility".

Newtonian rheology gives good print definition. By "resolubility" is meant the resin has the ability to slow down the rate of drying of the ink. It is critical that the printing ink not dry out on the print roll during printing. If the ink dries too fast, unlike solvent based printing inks, it will not redisperse when the roll is wetted with fresh ink and the engravings will become clogged. Also, it would be very difficult to clean the print roll at the end of a run.

The third form of stabilization resides in employing the aminoacrylate polymers as the stabilizer. The aminoacrylates are low molecular weight polymers or oligomers comprised of the monomers employed to form the laminating vehicle with other monomers polymerized thereon. Those monomers may include additional aminoacrylate but need not to form a laminating ink vehicle.

Various free-radical forming initiators such as peroxide compounds can be used in carrying out the emulsion polymerization of the monomers. Combination-type initiators employing both reducing agents and oxidizing agents can also be used. The use of this type of combined initiator is generally referred to in the art as "redox polymerization" or "redox system." The reducing agent is also often referred to as an activator and the oxidizing agent as an initiator. Suitable reducing agents or activators include bisulfites, sulfoxylates, or other compounds having reducing properties such as ferrous salts and ascorbic acid, and tertiary aromatic amines, e.g., N,N-dimethylaniline. The oxidizing agents or initiators include hydrogen peroxide, organic peroxides such as benzoyl peroxide, t-butyl hydroperoxide.

A specific combination-type initiator or redox system which can be used is hydrogen peroxide and sodium formaldehyde sulfoxylate. Thermal initiators include persulfates, such as ammonium or potassium persulfate, or perborates, peracid anhydrides, percarbonates, azo compounds, peresters, and the like.

The initiator is employed in the amount of 0.1 to 2%, preferably 0.25 to 0.75%, based on the weight of monomer introduced into the system. The activator is ordinarily added as an aqueous solution and the amount of activator is generally from 0.25 to 1 times the amount of initiator.

The concentration range of the stabilizing agents used in emulsion polymerization is from 0.5 to 10% based on the aqueous phase of the latex regardless of the solids content. The stabilizers employed are, in part, governed by the use to which the copolymer latex is to be put. By utilizing appropriate levels of surfactant, one can obtain latex polymer particles having a variety of average particle size ranges and distributions.

In order to maintain the pH of the system at the desired value, there is suitably added a buffering agent of any convenient type. Any alkaline material which is compatible with the stabilizing agent can be used as the buffer. The amount of buffer is that sufficient to adjust the pH of the system within the desired range, e.g., 7 to 11 and preferably 8 to 10. Final pH adjustment is typically effected through the use of a volatile amine or ammonia. Representative amines include methyl amine, diethylamine, triethylamine, ethanolamine, morpholine, etc.

Adhesion promotion of the polymeric films is achieved through corona treatment. The procedure is conventional for promoting adhesion in those films. In corona treatment, a polymeric film, such as polyester and polyolefin, is exposed to a high voltage. The high voltage effects a surface change on the film to promote adhesion. Many adhesive polymers show enhanced adhesion to the corona treated films vis-a-vis the non treated film.

Inks may be formulated in accordance with known techniques. Pigments are ground with suitable dispersing agents and other additives and the resultant pigment dispersion are let down with the laminating ink vehicle.

While the mechanism for bonding is not completely understood, it is believed that bonds are formed between oxygenated species present on the surface on the flexible film and the pendant amino groups on the interpolymer and contributing to the bond strength are certain inductive and steric effects associated with these amino groups. Corona treatment of a film generates carbonyl, hydroxyl, and carboxyl groups on the surface of the film. The observation that the bond strength is proportional to the level of corona treatment of the film supports this mechanism.

The following examples are provided to illustrate various embodiments of the invention and are not intended to restrict the scope thereof.

General Experimental Procedures

The following laboratory test was used to simulate the lamination of polypropylene film to extruded polyethylene using the laminating adhesive and comparative laminating vehicles described herein to provide bonding between the two films.

Laminating Film Ink Vehicle Test Procedure

1. Reduce the viscosity of each enumerated polymer dispersion or each ink formulated with polymer dispersion to 25 seconds using a #2 Zahn cup.

2. Corona treat the test film using a hand held Electro-Technic high voltage discharge gun. The film is given a two pass treatment. The test film is CGW-OPP, an oriented polypropylene film, 70 gauge.

3. Coat the dispersion or ink onto the OPP with a 150 quad anilox roller. Dry 10 seconds at 65.6° C. (150° F.). Allow sample to condition for 1 hour before laminating.

4. Lay a film of a metallized polyester/polyethylene laminate, the polyethylene side facing the coated OPP, onto the OPP. Using a Sentinel™ Heat Sealer with only the top bar heated, laminate by heat sealing at 163° C. (325° F.) at 30 psig for 2 seconds.

5. Condition heat sealed samples 24 hours at room temperature. Cut into one inch wide strips and measure the "T" bond strength on an Instron™ testing machine. Pull 4 strips and report the average bond strength in grams per inch width. Note any substrate tearing.

Laminating Inks

Described below is a typical laminating ink formulation for a white ink. For other inks, the white titanium dioxide pigment is replaced by the appropriate pigment. The pigments used in the inks tested are listed in Table 1.

White Laminating Ink Laminating Ink Letdown Vehicle

A series of white laminating inks were prepared from enumerated aqueous dispersions (sometimes referred to as the laminating adhesive, laminating vehicle or laminating ink let down vehicle). The white pigment dispersions were prepared from the following:

| Component | grams |
| --- | --- |
| Vancryl 68S[1] | 15 |
| Water | 1.30 |
| Surfynol 420[2] | 0.70 |
| Dipropylene glycol monomethyl ether | 0.50 |
| Titanium Dioxide | 30 |

[1]Vancryl ™ 68S is a trademark for the ammonium salt solution of a carboxylated styrenic oligomer manufactured by Air Products and Chemicals, Inc.
[2]Surfynol ™ 420 is a trademark for an ethoxylated tetramethyldecynediol having form 3 to 10 ethylene oxide units manufactured by Air Products and Chemicals, Inc.

The pigment dispersion was prepared in a Cowles™ disperser. The pigment dispersion was let down with the enumerated laminating vehicle composition to give a laminating ink:

| Component | grams |
| --- | --- |
| Vancryl 68S | 11.0 |
| Example (aqueous polymer dispersion) | 35.0 |
| Water | 6.5 |

The viscosity of the ink was measured with a #2 Zahn cup. The ink was roller printed on corona treated CGW-OPP film, laminated, and tested by the laminating adhesive test.

TABLE 1

Pigments Used to Produce Laminating Inks

| Color | Pigment* |
| --- | --- |
| White | Titanium Dioxide |
| Red | Sun ™ 211 3011 |
| Green | Cyan Green, Drew ™, GS4000 |
| Blue | Sunsperse ™ Blue, BHD 6000 |
| Black | Cabot ™ Black 490 |
| Yellow | Sico ™ Yellow NBD 1360 |

*The manufacturer or the trademark is listed; conventional ink pigments may be substituted therefor.

Polymerization

Unless otherwise noted, all emulsion polymerizations to form the laminating inks were carried out in a 2 liter jacketed glass reactor. The reactor was equipped with a pitched turbine agitator, thermocouple, ports for pumping in monomers and other additives, a reflux condenser, and a sparge for maintaining an inert atmosphere in the reactor. Tempered water was circulated through the reactor jacket so as to maintain the desired polymerization temperature. Deionized water was used in all experiments. The inerting gas was nitrogen. All monomers were commercial grade and used as received.

EXAMPLES 1–20

Examples 1–20 involve the preparation of a series of aqueous based surfactant stabilized laminating ink vehicles. ExampleS 1–8 are directed to the influence of aminoacrylate on the adhesive properties of the laminating vehicle vis-à-vis non aminoacrylate containing laminating vehicles or laminating inks. Examples 9–15 are directed to the influence of the level of amino acrylate in the laminating ink. These laminating vehicles were also evaluated for their effectiveness on corona treated polymer surfaces vis-à-vis non treated surfaces.

The flexible laminates were tested in accordance with the above procedure and the results are set forth in Tables 2 through 14.

Example 1

Surfactant Stabilized Acrylic 16.4% DMAEMA Laminating Emulsion

To the reactor was charged 330.2 g of water and 59.5 g of Abex™ 22S (a 25% active solution of the sodium salt of a proprietary anionic surfactant manufactured by Rhone Poulenc Corp.).

A monomer mixture was prepared consisting of

| | |
| --- | --- |
| 62 g of 2-ethylhexyl methacrylate, | 20.4 wt % |
| 117.5 g of isobutyl methacrylate, | 38.6 wt % |
| 28 g of styrene, | 9.2 wt % |
| 46.7 g of methyl methacrylate, and | 15.4 wt % |
| 50 g of 2-N,N-dimethylaminoethyl methacrylate | 16.4 wt % |

A 2% (by weight) of an aqueous solution of ascorbic acid was prepared.

Sixty-one g of the monomer mixture was added to the reactor, the agitator was turned on, and the mixture was heated to 50° C. When the temperature reached 50° C., 1.91 g of 70% active t-butyl hydroperoxide and 1 ml of the 2% ascorbic acid solution were added to the reactor. Polymerization began and the reactor contents were taken to 70° C.

The remaining monomer mixture and 17 ml of 2% ascorbic acid solution were individually added to the reactor over a 90 minute period. Temperature was maintained at 70±3° C. during the addition. When all the monomer mixture and ascorbic acid solution had been added, the temperature was raised to 75° C. and the polymer dispersion was held there for 1 hour. To react any residual monomers, a solution of 0.5 g of 70% t-butyl hydroperoxide in 5 ml of water and 0.14 g of ascorbic acid in 5 ml of water were each added all at once to the reactor.

When the residual unreacted monomer level was below 1000 ppm, the polymer dispersion was cooled to room temperature and filtered through a 150 micron filter bag to remove any coagulum. The physical properties were determined.

The non-volatile content was 43.08%, the pH was 8.45, and the viscosity was 84 centipoises (cps) using a Brookfield #3 spindle at 30 rpm, and 76 cps at 60 rpm. The dispersion had a milky bluish appearance.

Example 2

Staged Addition of DMAEMA

In this example, the DMAEMA is staged in over the polymerization time period so as to concentrate the amino methacrylate on the surface of the polymer particles.

The polymerization conditions and set-up are the same as in Example 1.

The reactor was charged with 330.2 g of water and 59.5 g of Abex™ 22S.

A monomer mixture consisting of 62 g of 2-ethylhexyl methacrylate, 117.5 g of isobutyl methacrylate, 28 g of styrene, 46.7 g of methyl methacrylate, and 10 g of DMAEMA was prepared.

A 2% solids solution of ascorbic acid was prepared.

To the reactor was added 52.8 g of the monomer mixture and the reactor contents were heated to 50° C. When the temperature reached 50° C., 1.91 g of 70% t-butyl hydroperoxide and 1 ml of the ascorbic acid solution was added to the reactor.

Heating was continued and when the temperature reached 70° C., the remaining monomer mixture and 17 ml of the ascorbic acid solution were pumped into the reactor over a 90 minute period. The temperature was maintained at 70±3° C. At the 30 minute mark, 10 g of DMAEMA was added to the monomer mixture. This was repeated at the 45, 60, and 75 minute mark. When the addition of the polymer mixture and ascorbic acid solution were completed, the temperature was raised to 75° C. and the polymer dispersion kept at that temperature for 1 hour. Then 0.5 g of t-butyl hydroperoxide in 5 ml of water and 0.14 g of ascorbic acid in 5 ml of water were each added to the reactor to polymerize any residual free monomer.

When the residual monomer level was below 1000 ppm, the polymer dispersion was cooled to room temperature, filtered through a 150μ filter bag, and the physical properties were determined.

The physical properties were: 42.18% non-volatiles, pH 8.63, viscosity 212 cps @ 30 rpm and 190 cps @ 60 rpm.

Example 3 (control)

Preparation of Laminating Emulsion w/o DMAEMA

An identical polymerization to Example 2 was carried except that the DMAEMA was omitted from the monomer mixture.

The physical properties were: 39.77% non-volatiles, pH 4.32, and the viscosity was 72 cps @ 30 rpm, and 72 cps @ 60 rpm.

Example 4 (Comparative Example)

Preparation of Laminating Ink Vehicle Employing N-vinylformamide

The polymerization procedure was identical to that of Example 3 except that n-butyl methacrylate was substituted for isobutyl methacrylate and N-vinyl formamide was substituted for DMAEMA.

The physical properties were: 34.3% non-volatiles, pH 4.37, viscosity 2564 cps @ 30 rpm and 1778 cps @ 60 rpm.

Example 5 (Comparative Example)

Preparation of Laminating Ink Vehicle Employing Methacrylic Acid

The polymerization procedure was identical to that of Example 3 except that n-butyl methacrylate was substituted for isobutyl methacrylate and an equimolar amount of methacrylic acid was substituted for DMAEMA.

The physical properties were: 42.27% non-volatiles, pH 3.25, viscosity 168 cps @ 30 rpm and 162 cps @ 60 rpm.

Example 6 (Comparative Example)

Preparation of Laminating Ink Vehicle Employing Lauryl Amine

To a portion of Example 5 latex was added an molar amount of lauryl amine equivalent to the methacrylic acid in the polymer.

Example 7 (Comparative Example)

Preparation of Laminating Ink Vehicle Employing 2-hydroxyethyl methacrylate

The polymerization procedure was identical to that of example 3 except that n-butyl methacrylate was substituted for isobutyl methacrylate and an equimolar amount of 2-hydroxyethyl methacrylate was substituted for DMAEMA.

The physical properties were 43.19% non-volatiles, pH 3.89, viscosity 1448 cps @ 30 rpm and 922 cps @ 60 rpm.

Example 8 (Comparative Example)

Preparation of Laminating Ink Vehicle Employing Added Lauryl Amine

To a portion of Example 7 latex was added a molar amount of lauryl amine equivalent to the 2-hydroxyethyl methacrylate in the polymer.

Examples 1 through 7 were evaluated as laminating adhesives for flexible films using the previously described adhesive test procedure. The results are shown in Table 2.

TABLE 2

| Adhesive "T" Bond Peel Values | |
|---|---|
| Example | "T" Bond (g/in width) |
| 1 | 137.3 |
| 2 | 249.7 |
| 3 (control) | 13.6 |
| 4 (comparative example) | 15.9 |
| 5 (comparative example) | 23.8 |
| 6 (comparative example) | 22.7 |
| 7 (comparative example) | 9.1 |
| 8 (comparative example) | 12.5 |

The Example 2 polymer, when tested, gave a bond strength of 249.7 g per inch while for Example 1, the value was 137 g per inch. Bond strength was improved by concentrating the amino methacrylate on the surface of the polymer particle. Examples 3, 5, and 7 which contained no tertiary amino acrylate nitrogen containing monomer gave very poor bonds. Example 4 which contained N-vinylformamide also gave a very poor bond. Example 6 contained lauryl amine which was ionically bound to the carboxyl groups and Example 8 contained lauryl amine dispersed in the latex. These, too, gave poor bonds.

Effect of Amino Acrylate Level

Examples 9–15 illustrate the effects of the level of aminoacrylate and the mode of its introduction into the polymer on the bonding performance of the polymer.

Example 9

The procedure of Example 2 was repeated except the level of DMAEMA was reduced to 8.95% by weight.

Example 10

The procedure of Example 2 was repeated except the level of DMAEMA was reduced to 7.29% by weight.

Example 11

The procedure of Example 2 was repeated except the level of DMAEMA was reduced to 7.29% by weight and isobutyl acrylate was substituted for n-butyl acrylate.

Example 12

The procedure of Example 2 was repeated except the level of DMAEMA was raised to 16.44% by weight and n-butyl methacrylate was substituted for isobutyl methacrylate.

Example 13

Preparation of Laminating Ink Vehicle with Triton Surfactant

This polymerization procedure was identical to Example 1 except that Abex™ 22S was replaced by 18 g of Triton™

X-405 (a 70% active solution of alkylaryl polyether alcohol containing 40 ethyleneoxy groups which is manufactured by Union Carbide Corp.) and 3 g of Witco™ SL-EP (a 30% active solution of sodium lauryl sulfate manufactured by Witco Corp.).

n-Butyl methacrylate was substituted for isobutyl methacrylate.

The physical properties were: 44.42% non-volatiles, pH 8.49, viscosity, 32 cps @ 30 rpm and 32 cps @ 60 rpm.

Example 14

Preparation of Laminating Ink Vehicle in 3 Gallon Reactor

The procedure of Example 13 was followed except the polymer dispersion was prepared in a 3 gallon stainless steel reactor by increasing the amounts of raw materials of Example 16 by a factor of 13.3.

The physical properties were: 45.85% non-volatiles; pH 8.50; viscosity, 176 cps @ 30 rpm and 156 cps @ 60 rpm; 0.2% "wet" coagulum; the particle size distribution, $D_n$, 0.120 μm; $D_W$, 0.135 μm; polydispersity, 1.2; molecular weight distribution of tetrahydrofuran soluble portion of polymer, $M_n$, 39,591 $M_W$, 161,421; polydispersity, 4.077.

The greater portion of the polymer was not soluble and can be considered very high molecular weight.

Example 15

Preparation of Laminating Ink Vehicle, Increased Initiator Level

The procedure of Example 13 was repeated but the level of initiator and ascorbic acid was increased.

The data resulting from the testing of the emulsions of Examples 9–15 are set forth in Table 3.

TABLE 3

Impact of Amino(meth)acrylate on "T" Bond Value

| Example | % DMAEMA % of total monomer | In initial monomer mix | Incremental amino-acrylate additions to monomer premix | "T" Bond (g/in) |
|---|---|---|---|---|
| 1 | 16.44 | 100% | none | 137.3 |
| 2 | 16.44 | 20% | 20% at 30, 45, 60, and at 75 min. | 249.7 |
| 9[1] | 8.95 | 20% | 40% at 60 and at 75 min. | 99.7 |
| 10[1] | 7.29 | none | 50% at 60 and at 75 min. | 76.0 |
| 11[2] | 7.29 | 20% | 40% at 60 and at 75 min. | 107.8 |
| 12[2] | 16.44 | 20% | 20% at 30, 45, 60, and at 75 min. | 286.0 |
| 13 | 16.44 | 20% | 20% at 30, 45, 60, and at 75 min. | 202.0 |
| 14 | 16.44 | 20% | 20% at 30, 45, 60, and at 75 min. | 238.4 |
| 15[3] | 16.44 | 20% | 20% at 30, 45, 60, and at 75 min. | 230.4 |

[1]Formula and procedure were identical except that the N,N-dimethylaminoethyl methacrylate (DMAEMA) was reduced.
[2]Isobutyl methacrylate was replaced by n-butyl methacrylate.
[3]Identical to Example 13 except that the amounts of ascorbic acid and t-butyl hydroperoxide were doubled.

From the data in Table 3 it is clear that the pendent dimethylamino groups in the polymer are necessary to provide the required bond strength for film to film lamination. The data demonstrate that the bond strength is proportional to the amino(meth)acrylate content of the polymer. Superior results were obtained when the amino(meth)acrylate was delayed into the reaction medium which is believed to concentrate the amino (meth)acrylate nearer the surface of the copolymer.

To further show the influence of amino(meth)acrylate on the laminating vehicle properties, the amine was neutralized through the addition of methane sulfonic acid, at different levels, into a surfactant stabilized laminating ink vehicle (Example 14) and the adhesion performance determined.. The results are shown in Table 3a.

TABLE 3a

The Effect of the Presence of a Non-volatile Acid in the Vehicle on Performance

| pH | "T" Bond (g/in) |
|---|---|
| 8.50 | 241 |
| 6.00[1] | 127 |
| 4.00 | 18 |

[1]Adjusted with methane sulfonic acid.

As suspected from the data in Table 3, the addition of acid to the Example 14 laminating vehicle reduced the adhesion performance of the laminating ink vehicle, the results being set forth in Table 3a. Table 10, Example 45, also verifies the validity of that expectation. Thus, whether the acid is incorporated into the copolymer or simply incorporated into the latex, the presence of carboxyl functionality can adversely affect the adhesiveness of the laminating ink vehicle.

Corona Treatment

The effect of corona treatment of the films was determined from some of laminating ink vehicle of Examples 1–15. The resulted are set forth in Table 4.

TABLE 4

The Influence of Corona Treatment on Adhesion

| | "T" Bond (g/in) | |
|---|---|---|
| Example | Corona Treated | Not Corona Treated |
| 1 | 137.3 | 45.4 |
| 2 | 249.7 | 47.7 |
| 12 | 286.0 | 80.6 |
| 3 (control) | 13.6 | 9.1 |
| 4 (comparative ex.) | 15.9 | 10.2 |
| 5 (comparative ex.) | 23.8 | 28.4 |

The data in Table 4 show that in order to achieve acceptable bond strengths as al commercial laminating vehicle (>100 g/in), it is necessary that the film be corona treated. Also, the comparative latexes which do not contain amino(meth)acrylates have poor bond strengths on both corona and non-corona treated film. Although the amino acrylate containing inks gave higher adhesive values on non treated films in comparison to non aminoacrylate containing inks, the adhesive value for the aminoacrylate containing laminating vehicles was at least 4 times the value obtained for the non amino acrylate containing laminating vehicles on non treated films. The non amino acrylate containing emulsions, although adhesives in their own right, had only slight improvement in adhesion over corona treated films.

Comparative Effects of Amino Acrylates

Examples 16 through 19 were generated to show the effect of different amino acrylates on the adhesivity of the laminating ink vehicle. The physical properties are summarized in Table 5 and the adhesion performance data is set forth in Table 6.

Example 16

Preparation of Laminating Ink Vehicle Staged Addition of DMAEMA

To the reactor was charged 200 g of water and 2 g of aqua ammonia. The monomers, 124 g of 2-ethylhexyl methacrylate, 235 g of n-butyl methacrylate, 56 g of styrene, 93.4 g of methyl methacrylate, and 20g of DMAEMA, were emulsified in a solution of 400 g of water, 45 g of T-Det™ O-407 (a 70% aqueous solution of a polyethoxylated octylphenol, manufactured by Harcos Chemicals, Inc.), and 7.5 g of SL-EP (a 30% aqueous solution of sodium lauryl sulfate manufactured by Witco Corp.).

The initiator solution consisted of 10 g of 70% t-butyl hydroperoxide and 50 g of water. The reducing solution consisted of 2.8 g of ascorbic acid dissolved in 50 g of water and 1 g of aqua ammonia.

The reactor contents were heated to 50° C. and 100 g of the monomer pre-emulsion, 4 g of the initiator solution, and 2 g of the reducing solution were added to the reactor. Initiation of polymerization occurred and the temperature was allowed to rise to 70° C.

While maintaining the reacting mixture at 70° C., the remaining monomer pre-emulsion was added over a 90 minute period and the remaining initiator and reducing solutions were added over a 105 minute period.

At the 30, 45, 60 and 75 minute marks, 20 g portions of DMAEMA were added to the monomer pre-emulsion.

When the residual monomer level was below 1,000 parts per million (ppm), the mixture was cooled, filtered and the physical properties determined. The solids content was 46.03%; the pH, 8.59; the viscosity, 56 cps, #3 spindle @ 30 rpm, and 46 cps @ 60 rpm.

Example 17

Preparation of Laminating Ink Vehicle Staged Addition of DMAEMA

The procedure of Example 16 was followed except DMAEMA was used in a lower amount.

Example 18

Preparation of Laminating Ink Vehicle Staged Addition of 4-Vinyl Pyridine

The procedure of Example 16 was followed except different aminoacrylates were used at differing amounts.

Example 19

Preparation of Laminating Ink Vehicle Staged Addition of DMAPMA

The procedure of Example 16 was followed except dimethylaminopropyl methacrylamide (DMAPMA) was substituted for DMAEMA. Table 5 sets forth the latex properties of Example 16 . 19 and Table 6 sets forth the results of testing.

TABLE 5

| | Latex Physical Properties | | | | |
| --- | --- | --- | --- | --- | --- |
| | Amino(meth)- | % | | Viscosity (cps) | |
| Example | acrylate | Solids | pH | at 30 rpm | at 60 rpm |
| 16 | Dimethylaminoethyl methacrylate | 46.03 | 8.59 | 56 | 46 |
| 17 | Dimethylaminoethyl methacrylate | 44.54 | 8.76 | 272 | 226 |
| 18 | 4-vinyl pyridine | 44.58 | 6.91 | 44 | 36 |
| 19 | Dimethylaminopropyl methacrylamide | 44.69 | 8.65 | paste | |

TABLE 6

| | Adhesion Performance | |
| --- | --- | --- |
| Example | % Amino(meth)acrylate | "T" Bond (g/in) |
| 16 | 16.44 | 244.0 |
| 17 | 13.60 | 237.2 |
| 18 | 16.44 | 91.9 |
| 19 | 16.44 | 216.8 |

The results show that 4-vinyl pyridine is effective as a laminating ink vehicle but not nearly as effective as the amino acrylate or the amino acrylamide in enhancing adhesion properties. The only difficulty with the amino acrylamide was one of viscosity.

Example 20

Effect of Acrylic Acid in Amino Acrylate Containing Laminating Adhesive

The procedure and formula were identical to Example 19 except that 30.5 g of acrylic acid (5.0% of the total monomers) was added to the monomer pre-emulsion.

The physical properties were: % solids, 46.59%; pH 7.11; viscosity, 32,840 cps #3 spindle @ 3 rpm. Within 2 days at room temperature, the emulsion coagulated to a stringy, gelatinous mass.

This example illustrates the presence of (meth)acrylic acid in the polymer composition can destabilize the latex. Recall Table 3a also showed that the presence of methane sulfonic acid also reduces the adhesiveness of the copolymer.

Laminating Ink Tests

Several of the laminating emulsions were formulated into laminating inks employing the formulations previously described and their adhesion performance determined. Ink formulations generally have a tendency to reduce the adhesive performance of laminating vehicle emulsions and such evaluations are necessary to determine whether the laminating emulsions are suited as laminating ink vehicles. The results are summarized in Table 7.

17

TABLE 7

Laminating Ink Adhesion Performance

| Entry | Example | Color | "T" bond (g/in) |
|---|---|---|---|
| 1 | 1 | neat | 137.0 |
| 2 | 1 | white | 173.6 |
| 3 | 2 | neat | 249.7 |
| 4 | 2 | white | 257.6 |
| 5 | 2 | red | 187.3 |
| 6 | 2 | red over white | 143.0 |
| 7 | 14 | neat | 238.4 |
| 8 | 14 | white | 233.6 |
| 9 | 14 | blue | 186.1 |
| 10 | 14 | red | 190.7 |
| 11 | 14 | black | 240.6 |
| 12 | 14 | yellow | 196.3 |
| 13 | 14 | red over white | 139.6 |

Discussion

It can be seen from the data in Table 7 that the laminating ink letdown vehicles containing the amino acrylates when formulated into printing inks largely retain bond values close to those of the neat laminating adhesive latexes. In one case of white inks, performance was actually enhanced. There is no theoretical explanation at this time except, possibly, that the white pigment reinforces the polymer film thereby improving cohesive strength of the bond. Even in the Examples 6 and 13 cases, commercially acceptable bond strengths are obtained when the film is blotch (100% coverage) printed with a white ink and then overprinted with other colors.

Resin Stabilized Laminating Vehicle Emulsions

Examples 21 through 26 are provided to illustrate the effect of resin fortification on the adhesiveness of the laminating emulsion and to provide comparisons when employed with various surfactants.

Example 21

Aqueous solution of the Ammonium Salt of Vancryl 65 Resin

A slurry was prepared from 500 g of powdered Vancryl™ 95 [A 100% solids flaked oligomer. The oligomer($M_n$ about 2500) is a carboxylated styrenic polymer manufactured by Air Products and Chemicals, Inc.] in 870 g of water. The slurry was transferred to a stirred reactor and heated to 50° C. At that temperature, 145 g of 28% aqua ammonia was added to the reactor. The temperature was raised to 70° C. and held at that temperature until a clear solution was obtained, about 90 minutes.

The solids content of the solution was 35.70% and the pH was 9.20.

Example 22

Preparation of Laminating Vehicle Stabilized With Resin and Surfactant

Into the reactor was charged 210 g of Example 21 solution, 95 g of water, and 10 g of Abex™ 22S (a 25% active solution of the sodium salt of a proprietary anionic surfactant manufactured by Rhone Poulenc Corp.). The monomer mixture consists of 112 g of 2-ethylhexyl acrylate, 74.7 g of n-butyl acrylate, 28 g of styrene, 46.7 g of methyl methacrylate, and 5 g of 2-(dimethylamino)ethyl methacrylate (DMAEMA).

18

An initiator solution was prepared from 2.5 g of 70% t-butyl hydroperoxide and 50 g of water. The reducing agent was a solution of ammonium ascorbate was prepared from 0.7 g of ascorbic acid, 0.5 g of 28% aqua ammonia, and 50 ml of water. Fifty g of the monomer mixture was added to the reactor and the reactor contents heated to 50° C. At 50° C., 4 ml of the initiator solution and 2 ml of the reducing agent solution was added to the reactor. When the temperature reached 70° C., the remaining monomer mixture, initiator solution, and reducing agent solution were added over a 180 minute period. Ten g portions of DMAEMA were added to the monomer mixture at the 120 and 150 minute mark. The polymerization temperature was maintained at 70 ±3° C. during the additions and for 15 minutes after completion of the additions. Five tenths 9 of t-butyl hydroperoxide dissolved in 5 g of water and 0.14 g of ascorbic acid dissolved in 5 g of water were each added to the polymer dispersion to polymerize any remaining free monomer. The polymer dispersion was maintained at 70° C. until the residual unreacted monomer was less than 1000 ppm. The polymer dispersion was cooled to room temperature, filtered through a 150μ filter bag, and the physical properties were determined.

The physical properties were: 49.11% non-volatiles, pH 8.48, and viscosity 176 centipoises (cps) @ 30 rpm and 162 cps @ 60 rpm.

Example 23

Preparation of Laminating Vehicle w/o DMAEMA Stabilized with Resin and Sodium Dihexyl Sulfosuccinate Into the reactor was charged 205 g of Example 21 solution, 103 g of water, and 3.3 g of Aerosol™ MA-801 (MA-801 is an 80% active solution of sodium dihexyl sulfosuccinate in a mixture of 2-propanol and water manufactured by American Cyanamid Corp.). A monomer mixture of 112 g of 2-ethylhexyl acrylate, 74.7 g of n-butyl acrylate, 28 g of styrene, and 46.7 g of methyl methacrylate was prepared. Ammonium persulfate (3.3 g) was dissolved in 11 g of water. The reactor contents were heated to 80° C. and the ammonium persulfate solution was added. The monomer mixture was then pumped in over a 180 minute period while maintaining the temperature at 80 ±3° C. When all the monomer was in, 55 g of water was added and the polymer dispersion stirred at 80° C. for 1 hour. Then an additional 27 g of water was added while allowing the temperature to drop to 50° C. Then to polymerize any unreacted monomers, a solution of 0.66 g of erythorbic acid, 0.66 g of N,N-dimethylaminoethanol, and 8 g of water was added to the reactor followed by a solution of 1.3 g of 70% t-butyl hydroperoxide in 8 g of water. When the residual monomer was less than 1000 ppm, the polymer dispersion was cooled to room temperature. 60 g of water added, filtered through a 150μ filter bag, and the physical properties were determined.

The physical properties were: 44.12% non-volatiles, pH 8.39, and viscosity 1,644 cps @ 60 rpm.

Example 24

Preparation of Laminating Vehicle DMAEMA Stabilized with Resin and Sodium Dihexyl Sulfosuccinate The procedure and formulation were identical to Example 23 except that 5.2 g (wt % of copolymer) of DMAEMA was added to the monomer mix at the 150 minute mark.

The physical properties were: 44.72% non-volatiles, pH 8.26, viscosity 208 cps @ 30 rpm and 208 cps @ 60 rpm.

Example 25

Preparation of Laminating Vehicle Stabilized with Resin and Ethoxylated Surfactant

To the reactor was charged 210 g of Example 21 solution, 95 g of water, 10 g of Triton X-405 (a 70% active solution of octylphenoxypolyethoxyethanol in water manufactured by Union Carbide Corp.), and 2 g of a 30% solution of sodium lauryl sulfate. The monomer mixture consisted of 112 g of 2-ethylhexyl methacrylate, 74.7 g of n-butyl methacrylate, 28 g of styrene, 46.7 g of methyl methacrylate, and 5 g of DMAEMA. The initiator solution consisted of 5 g of 70% t-butyl hydroperoxide in 25 g of water. The reducing agent solution consisted of 1.4 g of ascorbic, 0.5 g of 28% aqua ammonia, and 25 g of water. The reactor contents were heated to 50° C., and 52.8 g of the monomer mixture was added. When temperature returned to 50° C., 2 g of the initiator solution and 1 g of the reducing agent solution were separately added to the reactor. Polymerization began. When the temperature reached 70° C., the remaining monomer mixture was added over a 90 minute period. The remaining initiator solution and reducing agent solution were added over a 105 minute period. The polymerization temperature was maintained at 70 ±3° C. Ten g of DMAEMA were added to the monomer mixture at the 60 and 75 minute mark. The polymer dispersion was then held at 70° C. for 30 minutes and then 0.5 g of t-butyl hydroperoxide was added to the reactor followed by 0.14 g of ascorbic acid in 4 g of water. These additions were to polymerize any remaining monomer. When the residual was less than 1000 ppm, the polymer dispersion was cooled to room temperature, filtered through a 150μ filter bag, and the physical properties determined.

The physical properties were: 55.15% non-volatiles, pH 8.93, and viscosity 1608 cps @ 30 rpm and 1234 cps @ 60 rpm. The polymer dispersion was diluted to 43.94% non-volatiles with water before testing. The diluted dispersion had a viscosity of 94 cps @ 30 rpm and 88 cps @ 60 rpm.

Example 26

Preparation of Laminating Vehicle Stabilized with Resin and Surfactant

The procedure and formulation was identical to Example 24 except the Triton X-405 and the Witco SL-EB were removed and replaced by 10 g of Abex™ 22S. There was added 10 g of DMAEMA to the monomer mix, the monomer mixture was added over a 180 minute period, and 10 g portions of DMAEMA were added to the monomer mixture at the 120, 135, 150, 165 minute marks.

The physical properties were: 43.26% non-volatiles, pH 8.89, and viscosity 568 cps @ 30 rpm and 490 cps @ 60 rpm.

Resin Fortified Laminating Vehicle Emulsion Testing

The resin fortified polymer dispersions of Examples 22 through 26 were used to laminate OPP to polyethylene and then tested using the previously described Laminating Film Ink Vehicle and Laminating Adhesive Test Procedure. The data are summarized in Table 8.

TABLE 8

Influence of Level of Amino(meth)acrylate on Adhesion Performance

| Example | Amino Monomer (% of total polymer)[1] | Bond Strength (grams/inch) |
| --- | --- | --- |
| 22 | 7.01 | 148.7 |
| 23 | 0.00 | 9.1 |
| 24 | 1.53 | 13.6 |
| 25 | 7.01 | 165.7 |
| 26 | 12.94 | 193.0 |

[1]Includes the resin from Example 21 solution in each example.

Discussion

Shelf stable compositions were developed containing up to over 16% resin solids (as a percent of total polymer solids) and containing no more amino(meth)acrylate monomer than the surfactant stabilized latexes. These laminating vehicles gave bond adhesions comparable to those of the surfactant stabilized latexes. Again, the absence of DMAEMA in Example 23 and the low level of DMAEMA in Example 24 reveal the significance of higher levels of amino acrylate to laminating vehicle adhesion.

Example 27

Preparation of Laminating Vehicle Stabilized with Resin and Surfactant

To the reactor was charged 211.5 g of solution made by Example 21 process (32.34% solids, pH=9.44) and 31.5 g of water. A monomer pre-emulsion was prepared from 300 g of water, 33.8 g of T-Det O-407™ (a 70% aqueous solution of a polyethoxylated octylphenol manufactured by Harcos Organics, Inc.), 5.6 g of a 30% solution of sodium lauryl sulfate, 93 g of 2-ethylhexyl methacrylate, 176.3 g of butyl methacrylate, 42 g of styrene, 70.1 g of methyl methacrylate and 15 g of N,N-dimethylaminoethyl methacrylate (DMAEMA). An oxidant solution consisted of 7.5 g of 70% t-butyl hydroperoxide in 37.5 g of water. The reductant consisted of 2.1 g of ascorbic acid, 37.5 g of water, and 0.75 g of aqua ammonia. The reactor contents were heated to 50° C. and 75 g of the monomer pre-emulsion was added, followed by 3 ml of the oxidant solution and 1.5 ml of the reductant solution. The temperature was raised to 70° C. and polymerization was initiated as evidenced by a temperature rise of about 5° C. The remaining monomer pre-emulsion was pumped in over a 90 minute period. At the 30, 45, 60 and 75 minute marks, 18.5 g portions of DMAEMA were added to the monomer pre-emulsion. The remaining oxidant and reductant solutions were pumped in over a 105 minute period. Polymerization temperature was maintained at 70 ±2° C. When the residual monomer content of the dispersion was less than 1000 ppm, as measured by gas chromatography, the polymer dispersion was cooled to room temperature, filtered through a 100μ bag, and characterized.

The physical properties were: 48.74% non-volatiles, pH 8.86, grits 78 ppm, and viscosity; 216 cps #3 spindle @ 30 rpm, and 196 cps @ 60 rpm.

Example 28

Preparation of Laminating Vehicle Containing t-Butylaminoethyl Methacrylate Stabilized with Resin and Surfactant

The polymerization recipe and procedure were identical to Example 27 except that equal weights of t-butylaminoethyl methacrylate were substituted for the DMAEMA.

Example 29

Preparation of Laminating Vehicle Containing 3-Dimethylaminoneopentyl Methacrylate Stabilized with Resin and Surfactant Same as Example 27 except that 3-dimethylaminoneopentyl methacrylate (DMAnPMA) was substituted for DMAEMA.

Example 30

Preparation of Laminating Vehicle Containing 2-Morpholinoethyl Methacrylate Stabilized with Resin and Surfactant Same as Example 27 except that 2-morpholinoethyl methacrylate (2MEMA) was substituted for DMAEMA.

Example 31

Preparation of Laminating Vehicle Containing 4-vinyl pyridine Stabilized with Resin and Surfactant Same as example 27 except that 4-vinyl pyridine (4VP) was substituted for DMAEMA.

Example 32

Preparation of Laminating Vehicle Containing N,N-diethylaminoethyl Methacrylate Stabilized with Resin and Surfactant Same as Example 27 except that N,N-diethylaminoethyl methacrylate (DEAEMA) was substituted for DMAEMA.

Examples 33 through 45

The process and formulation of Example 27 were used except that other amino functional monomers and varying amounts of the amino functional monomers were used. Where the amount of amino functional monomer was other than 89 g (15 g in the initial charge and four 18.5 g increments), the other monomers were proportionately adjusted so that the theoretical % non-volatiles was constant at 50.21 %. The amino functional monomers were proportioned as in Example 27.

Example 46

Preparation of Laminating Vehicle Containing DMAEMA Stabilized with High Resin Content and Surfactant The process and formulation of Example 27 was used except that the resin stabilizer, Vancryl 65 resin, was increased by 50%, the amount of DMAEMA was 50 g but the other monomers were proportionately reduced to keep the theoretical percent non-volatiles at 50.21%.

The properties of the laminating vehicle polymer dispersions of Examples 27–46 are set forth in Table 9. The adhesion performance of the laminating and laminating ink vehicles using the previously described "Laminating Film Ink Vehicle and Laminating Adhesive Test Procedure are summarized in Table 10.

TABLE 9

Physical Properties of Polymer Dispersions

| Example | % Non-Volatiles | pH | Grits (ppm) | Viscosity, cps #3 @ 30 rpm | #3 @ 60 rpm |
|---|---|---|---|---|---|
| 27 | 48.74 | 8.86 | 78 | 216 | 196 |
| 28 | 49.11 | 9.13 | 10 | 192 | 178 |
| 29 | 48.06 | 8.54 | 25 | 100 | 96 |
| 30 | 49.40 | 8.39 | 10 | 80 | 78 |
| 31 | 49.15 | 8.70 | 11,000 | 260 | 234 |
| 32 | 48.71 | 8.66 | 79 | 120 | 118 |
| 33 | 50.32 | 8.54 | 5 | 128 | 122 |
| 34 | 49.04 | 8.92 | 25 | 124 | 116 |
| 35 | 48.74 | 8.86 | 78 | 216 | 196 |
| 36 | 49.42 | 8.96 | 85 | 100 | 94 |
| 37 | 49.29 | 8.91 | 44 | 108 | 106 |
| 38 | 49.11 | 9.13 | 10 | 192 | 178 |
| 39 | 48.71 | 8.66 | 79 | 120 | 118 |
| 40 | 48.06 | 8.54 | 25 | 100 | 96 |
| 41 | 49.15 | 8.70 | 11,000 | 260 | 234 |
| 42 | 48.86 | 8.92 | 197 | 88 | 78 |
| 43 | 49.45 | 8.67 | 35 | 88 | 80 |
| 44 | 49.04 | 8.58 | 105 | 68 | 62 |
| 45 | 46.89 | 8.15 | 80 | 44 | 42 |
| 46 | 49.34 | 8.91 | 127 | 116 | 112 |

TABLE 10

Adhesion Performance of Neat Laminating Adhesive

| Example | Monomer | % of Total Monomer | "T" Bond g/in |
|---|---|---|---|
| 27 | N,N-Dimethylaminoethyl methacrylate | 16.44 | 233.0 |
| 33 | ditto | 4.64 | 194.1 |
| 34 | ditto | 9.28 | 222.5 |
| 46 | ditto | 9.28 | 247.4 |
| 35 | ditto | 16.44 | 233.8 |
| 36 | t-Butylaminoethyl methacrylate | 4.64 | 132.8 |
| 37 | ditto | 9.28 | 220.2 |
| 38 | ditto | 16.44 | 242.3 |
| 28 | ditto | 16.44 | 244.0 |
| 29 | 3-Dimethylaminoneopentyl methacrylate | 16.44 | 189.3 |
| 30 | 2-Morpholinoethyl methacrylate | 16.44 | 96.5 |
| 31 | 4-Vinyl pyridine | 16.44 | 60.2 |
| 32 | N,N-Diethylaminoethyl methacrylate | 16.44 | 189.0 |
| 39 | ditto | 16.44 | 198.6 |
| 40 | 3-Dimethylamino-neo-pentyl methacrylate | 16.44 | 213.4 |
| 41 | 4-Vinyl pyridine | 16.44 | 60.2 |
| 42 | 3-(Diethylamino)-2-hydroxypropyl methacrylate | 4.45 | 178.2 |
| 43 | ditto | 6.24 | 248.6 |
| 44 | 3-(N-Morpholino)-2-hydroxypropyl methacrylate | 4.75 | ~30 |
| 45 | N-[3-(Dimethylamino)propyl] maleamic acid[1] | 13.95 | 13.6 |

[1]The product of the reaction between maleic anhydride and N,N-dimethylpropylene diamine. The product is a crystalline material melting at 56° C.

Discussion

The data of Table 10 indicate that (a). the adhesion performance is proportional to the amount of amino functional monomer in the polymer dispersion, and (b). the adhesion performance is influenced by the structure of the amino functional monomer. The most efficient amino monomers were the amine adducts of glycidyl methacrylate (Examples 42 and 43). The Example 44 emulsion gave a low value although when the emulsion was prepared in the same manner but converted to the hydroxypropyl methacrylate by post treatment of the glycidyl containing polymer, significantly higher values were obtained. In Example 46 where the amount of resin stabilizer carboxylated styrene polymer (Vancryl 65) was increased by 50% and the same amount of DMAEMA as Example 34, there was no decrease in the bond adhesion. In fact, there was an increase. Again, it would not have been expected that laminating ink vehicles containing amino-(meth)acrylates could be prepared in the presence of a carboxylated styrene polymer (Vancryl 65). The Example 45 latex which not only had amine functionality but also had carboxyl functionality had very poor bond adhesion. This example also tends to support other data demonstrating that pendant carboxyl groups in a polymer containing pendant amino groups reduces the bond adhesion properties of the polymer.

Example 47

Preparation of Laminating Vehicle Containing DMAEMA Stabilized with High Resin Content and Surfactant To the reactor was charged 287.6 g of Example 21 solution. The monomer emulsion consisted of 274.1 g of water, 11.2 g of Witco SL-EP, 94.2 g of 2-ethylhexyl methacrylate, 178.5 g of butyl methacrylate, 42.5 g of styrene, 71 g of methyl methacrylate, and 10 g of DMAEMA. The oxidant was a solution of 7.5 g of 70% t-butyl hydroperoxide in 37.5 g of water. The reductant was a solution of 2.1 g of ascorbic acid and 0.75 g of aqua ammonia in 37.5 g of water. The polymerization process was essentially identical to that of Example 9. Ten g portions of DMAEMA were added at the 30, 45, 60, and 75 minute marks.

The physical properties were: % non-volatiles, 49.95; pH, 9.23; grits, 48 ppm; Brookfield viscosity; 52 cps, #3 @ 30 rpm; 2 cps, #3 @ 60 rpm.

The "T" bond strength was 217.9 g/in.

Example 48

Preparation of Laminating Vehicle Containing DMAEMA Stabilized with High Resin Content and Surfactant The formulation and procedure was identical to Example 47 except that the monomer emulsion also contained 33.8 9 of Harcos T-Det O-407.

The physical properties were: % non-volatiles, 49.34; pH, 8.91; grits, 127 ppm; Brookfield viscosity; 136 cps, #3 @ 30 rpm; 128 cps, #3 @ 60 rpm.

The "T" bond strength was 247.4 g/in which showed that high resin content did not adversely affect the adhesive performance.

Example 49

Preparation of Laminating Vehicle Containing DMAEMA Stabilized with High Resin Content w/o Surfactant The formulation was identical to Example 47 except that the water (247.1 g) in the monomer emulsion was charged to the reactor and the Witco surfactant was removed from the monomer mixture. In other words, a mixture of the monomers was used instead of a monomer emulsion.

The physical properties were: % non-volatiles, 49.01; pH, 9.60; grits, 1585 ppm; Brookfield viscosity, 104 cps, #3 @ 30 rpm; 94 cps, #3 @ 60 rpm.

The "T" bond strength was 199.8 g/in thus showing that the resin stabilizer did not adversely affect adhesion.

Example 50

Preparation of Laminating Vehicle Containing MAEMA Stabilized with High Resin Content and Surfactant To the reactor was charged 287.6 g of an Example 21 solution (35.67% solids).

The monomer pre-emulsion consisted of 271 g of water, 5.6 g of SL-EP, (a 30% aqueous solution of sodium lauryl sulfate), 107.5 g of 2-ethylhexyl acrylate, 49 g of styrene, 254 g of methyl methacrylate, and 5 g of DMAEMA.

The initiator solution was 7.5 g of 70% t-butyl hydroperoxide dissolved in 37.5 g of water. The reducing solution was 2.1 g of ascorbic acid dissolved in 40.7 g of water and 0.7 g of aqua ammonia. The contents of the reactor were heated to 50° C., and 75 g of the monomer pre-emulsion were added to the reactor, followed by 3 g of initiator solution and 1.5 g of reducing solution. Polymerization began. The temperature was allowed to rise to 70° C., and the remaining monomer pre-emulsion was added over a 90 minute period. The remaining initiator and reducing solutions were added over a 105 minute period. The temperature was maintained at 70 ±30° C. during the polymerization. At the 30, 45, 60, and 75 minute marks, 5 g portions were added to the monomer pre-emulsion. When the residual monomer level was below 1,000 ppm, the latex was cooled, filtered and its physical properties determined.

Example 51

The procedure and formulation of Example 50 are identical except that the total amount of DMAEMA added was 50 g. The other monomers were proportionately reduced so as to maintain the same % solids (non-volatiles) content in the latex.

Example 52

The procedure was identical to that of Example 50, but the reactor charge was 279 g of an Example 21 solution (32.7% solids). The monomer pre-emulsion consisted of 300 g of water, 33.8 g of T-Det O-407, 5.6 g of SL-EP, 163.4 g of 2-ethylhexyl acrylate, 109 g of n-butyl acrylate, 40.9 g of styrene, 68.1 g of methyl methacrylate, and 15.0 g of DMAEMA. At the 30, 45, 60, and 75 minute marks, 18.5 g portions of DMAEMA were added to the monomer pre-emulsion.

Example 53

The procedure and formulation of Example 50 are identical except that the total amount of DMAEMA added was 89 g. The other monomers were proportionately reduced so as to maintain the same % solids (non-volatiles) content in the latex.

The physical properties of Examples 50 to 53 are summarized in Table 11 and the bond adhesion performance in Table 12.

TABLE 11

Physical Properties of Laminating Vehicle Dispersions

| Example | % Non-Volatiles | pH | Grits (ppm) | Viscosity, cps #3 @ 30 rpm | #3 @ 60 rpm |
|---|---|---|---|---|---|
| 50 | 49.89 | 9.08 | 25 | 56 | 52 |
| 51 | 50.43 | 9.19 | 87 | 60 | 58 |
| 52 | 44.29 | 8.81 | 517 | 268 | 248 |
| 53 | 50.04 | 9.23 | 99 | 552 | 486 |

TABLE 12

Adhesion Performance of Neat Laminating Vehicle Dispersion

| | Amino Functional Monomer | | |
|---|---|---|---|
| Example | Monomer | % of Total Monomer | "T" Bond, g/in |
| 50 | N,N-Dimethylaminoethyl methacrylate | 4.64 | 187.2 |
| 51 | ditto | 9.29 | 184.8 |
| 52 | ditto | 15.84 | 215.6 |
| 53 | ditto | 16.44 | 202.0 |

These examples show the influence of increasing levels of aminoacrylate in the copolymer on adhesion. The results show good adhesion even as low as about 4 wt % amino acrylate.

Laminating Ink Vehicles

Selected examples were formulated into laminating inks using the previously described formulation procedure. The data are summarized in Table 13.

TABLE 13

Adhesion Performance of Laminating Inks

| Example | Color | "T" Bond (g/in) |
|---|---|---|
| 27 | white | 194.1 |
| 27 | red | 172.5 |
| 52 | white | 136.2 |
| 53 | white | 130.5 |
| 53 | red | 156.6 |
| Vancryl 989[1] | red | 15.9 |

[1]Vancryl 989 acrylic emulsion is a resin fortified styrene/acrylic latex but does not contain polymerized units of an amino(meth)acrylate.

The results show excellent adhesion when the laminating vehicles containing polymerized units of amino (meth) acrylates are utilized as laminating ink vehicles. The effect of the amino acrylate is also noted from the lack of adhesivity of Vancryl 989 emulsion.

Effect of Amino Acrylate as Stabilizer

There may be circumstances where one is required to conduct the polymerization of laminating adhesives under acidic (pH <7) conditions or employ the laminating vehicle where an acidic laminating vehicle is needed. An example of a low pH polymerization is one involving vinyl acetate. Vinyl acetate can not be polymerized under alkaline conditions because of rapid hydrolysis to acetic acid and acetaldehyde. Many pigment dispersions for laminating inks are unstable under alkaline conditions and require an acidic letdown vehicle. Examples 54 through 58 illustrate the preparation of laminating vehicle under acidic conditions using an aminated resin as a stabilizing component.

Example 54

Preparation of DMAEMA Resin Stabilizer

A two liter glass reactor was equipped with a pitched turbine agitator, ports for pumping in monomers and other additives, a sparge for maintaining an inert atmosphere in the reactor, a thermocouple, and a reflux condenser. The reactor was inserted in an electrically heated Glascol™ heating mantle. To the reactor was charged 365 g of diethylene glycol monoethyl ether acetate (DEGMEA). The monomer mixture consisted of 400 g of n-butyl acrylate (34.8%), 500 g of styrene (43.5%), and 250 g (21.7%) of N,N-dimethylaminoethyl methacrylate (DMAEMA). The initiator solution consisted of 135 g of DEGMEA and 30 g of di-t-butyl peroxide.

The reactor was sparged with nitrogen and its contents heated to 170° C. While maintaining the temperature at 170 ±5° C., The monomer mixture was added over a 105 minute period. The initiator solution was added over a 120 minute period. When all the monomer and initiator had been added, the temperature was maintained for 30 minutes. The reflux condenser was removed and the reactor equipped for vacuum distillation. The solvent was stripped under high vacuum. The temperature was not allowed to rise above 185° C. When no further solvent distilled over, the reactor was returned to atmospheric pressure, the top of the reactor was removed, and the resin was poured into a shallow pan to cool. The resin was a yellow taffy-like material weighing 1059 g.

Example 55

Preparation of Aminated Resin Stabilizer Solution

A mixture of 400 g of Example 54 resin, 800 g of water, and 20 g of glacial acetic acid was mixed and heated at about 75° C. until the resin dissolved.

The material was a clear yellow solution, 34.4% non-volatiles, pH 4.39, and the viscosity was 932 centipoises (cps) @ 30 rpm and 920 cps @ 60 rpm.

Example 56

Preparation of Laminating Vehicle Containing DMAEMA Resin Stabilizer and Surfactant To the jacketed reactor was charged 215 g of the Example 55 aminated stabilizer resin solution and 109 g of water. A monomer mixture was prepared from 112 g of 2-ethylhexyl acrylate, 74.7 g of n-butyl acrylate, 28 g of styrene, and 46.7 g of methyl methacrylate. A 2% aqueous solution of ascorbic acid was prepared. The initiator solution consisted of 1.9 g of t-butyl hydroperoxide and 15.1 g of water. To the reactor was added 10 g of the monomer mixture and the reactor contents heated to 50° C. At 50 ° C., 1.91 g of 70% t-butyl hydroperoxide and 1 ml of ascorbic acid solution was added to the reactor. Polymerization began. When 70° C. was reached, the remaining monomer mixture, 17 g of the ascorbic acid solution and the initiator solution were each added over a 90 minute period. The temperature was maintained at 70 ±3° C. The polymer dispersion was diluted with 175 g of water. The polymer dispersion was maintained at 70° C. until the residual free monomer was less than 1000 ppm.

The polymer dispersion was cooled to room temperature, filtered through a 150μ filter bag to remove any coagulum, and the physical properties were determined.

Example 57 (control)

Preparation of Laminating Vehicle w/o DMAEMA Containing Resin Stabilizer and w/o Amino Acrylate A resin fortified emulsion using a low molecular weight carboxylated resin as stabilizer was prepared as a control and employed in place of the aminated resin solution.

To the reactor was charged 74.7 g of Vancryl™ 65 [A 100% solids flaked oligomer. The oligomer ($M_n$ about 2500) is a carboxylated styrenic polymer manufactured by Air Products and Chemicals, Inc.], 219 g of water, and 3.35 g of Aerosol™ MA-801 (an 80% active aqueous solution of sodium dihexyl sulfosuccinate manufactured by American Cyanamid Co.). The stirred slurry was heated to 50° C. and a solution of 22 g of 28% aqua ammonia and 5 g of water were added over a 15 minute period. The temperature was raised to 80° C. and the mixture stirred until the Vancryl 95 resin had completely dissolved. A monomer mixture consisting of 112 g of 2-ethylhexyl acrylate, 74.7 g of n-butyl acrylate, 28 g of styrene, and 46.7 g of methyl methacrylate was prepared. The initiator solution consisted of 3.35 g of ammonium persulfate dissolved in 16.2 g of water. The initiator solution was added to the reactor and the monomer mixture was added over a 180 minute period. The temperature was maintained at 80 ±3° C.

To the polymer dispersion was added 72 g of water over a 15 minute period. When the temperature was 50° C., a solution comprising 0.65 g of erythorbic acid, 0.65 g of N,N-dimethylaminoethanol, and 13.4 g of water and a solution comprising 1.35 g of 70% t-butyl hydroperoxide and 13.4 g of water were each added to the reactor in order to polymerize any residual monomers. When the free monomer content was below 1000 ppm, the polymer dispersion was cooled to room temperature, filtered through a 150μ filter bag, and the physical properties were determined.

The physical properties were: 46% non-volatiles, pH 8.6, and viscosity 1025 cps @ 30 rpm.

Example 58, Control

Preparation of Laminating Vehicle w/o DMAEMA Containing Resin Stabilizer and w/o Amino Acrylate The procedure and formulation were identical to Example 57 except that the aqua ammonia used to solubilize the carboxylated styrene resin was replaced and the non-volatile amine, dodecyl amine was substituted therefor. The properties of the laminating vehicle emulsions of Examples 56–58 are set forth in Table 13 and Table 14 sets forth the results of adhesive tests on corona treated OPP.

TABLE 13

Physical Properties of Polymer Dispersions

| Example | % Non-Volatiles | pH | Viscosity, cps #3 @ 30 rpm | #3 @ 60 rpm |
|---|---|---|---|---|
| 56 | 22.19 | 4.53 | 74 | 30 |
| 57 | 46.0 | 8.6 | 1025 | |
| 58 | 47.73 | 8.18 | 3904 | 3390 |

TABLE 14

Adhesion Performance of Vehicles and Laminating Inks

| Example | "T" Bond (g/in) | Color | "T" Bond (g/in) |
|---|---|---|---|
| 56 | 207.7 | blue | 171.4 |
| 57 (control) | 9.1 | | |
| 58 (control) | 6.8 | | |

Discussion

Table 14 shows that the aminated copolymer may be used as a stabilizer for producing laminating emulsions and yet serve to provide adhesivity even though that is the only polymer having amino acrylate functionality. The control examples, Examples 56 and 57, show that amination through neutralization of carboxyl functionality in a copolymer is not equivalent to the incorporation of amino acrylate in the copolymer or in the stabilizing agent employed for producing the copolymer in the laminating vehicle emulsion. Example 56, for example, provided good bond adhesion presumably, because on drying, the acetic acid volatilizes leaving the amino groups of the resin to bond to the corona treated OPP film. It is postulated that Example 57 gave no adhesion because the resin did not contain amino groups. The Example 58 vehicle contained non volatile amine group ionically bonded to the carboxylated resin. Accordingly, the vehicle gave no adhesion.

What is claimed is:

1. In a thin film flexible laminate suited for the packaging of snack foods formed from at least one corona treated, thin polymeric film and at least one other thin polymeric, cellulosic or metal film, said corona treated polymeric film and at least one other polymeric, cellulosic or metal film, bonded together with an aqueous laminating adhesive, the improvement in the flexible laminate which resides in an emulsion polymerized, aqueous laminating adhesive comprised of an acrylic polymer having polymerized units of an acrylate/methacrylate monomer selected from the group consisting of a $C_{1-10}$ alkyl acrylate or a $C_{1-10}$ alkyl methacrylate and polymerized units of unsaturated amine selected from the group consisting of an amino(meth)acrylate, an amino (meth)acrylamide and a vinyl amine.

2. The flexible laminate of claim 1 wherein the acrylic polymer has a $T_g$ from about −50° to about +60° C.

3. The flexible laminate of claim 2 wherein the acrylic polymer is comprised of polymerized units of:

(a) from 40 to 65% by weight of acrylate/methacrylate;

(b) from 0 to 50% by weight styrene/α-methylstyrene; and, (c) from 3 to 50% by weight of amino acrylate.

4. The flexible laminate of claim 3 wherein the acrylate/methacrylate in said acrylic polymer is an acrylate/methacrylate selected from the group consisting of 2-ethylhexyl acrylate, butyl acrylate, isobutyl acrylate, methyl methacrylate.

5. The flexible laminate of claim 4 wherein the amino acrylate in said acrylic polymer is present in an amount of from 8 to 30% by weight of the acrylic polymer and the laminating vehicle incorporates at least one ink pigment.

6. The flexible laminate of claim 4 wherein the acrylic polymer is comprised of from 8 to 30% amino acrylate by weight of the acrylic polymer and the amine is an aminoacrylate selected from the group consisting of diethylaminoethyl acrylate, diethylaminoethyl methacrylate, 2-(dimethylamino)ethyl acrylate, 2-(dimethylamino)ethyl methacrylate, 2-aminoethyl acrylate, 2-aminoethyl methacrylate, 2-methylaminoethyl acrylate and 2-methylaminoethyl methacrylate, 2-(diethylamino)ethyl acrylate, 2-(diethylamino)ethyl methacrylate, tertiary butylaminoethyl methacrylate; 2-N-morpholinoethyl methacrylate and 2-N-morpholinoethyl acrylate, 3-(dimethylamino)-2-hydroxypropyl methacrylate, 3-(diethylamino)-2-hydroxypropyl methacrylate, 3-N-morpholino-2-hydroxypropyl methacrylate, 3-(diethylamino)-propyl methacrylamide.

7. The flexible laminate of claim 6 wherein the polymeric films employed in the flexible laminate have a thickness from about 0.5 to about 2 mil.

8. The flexible laminate of claim 7 wherein at least one of the polymeric films employed in the flexible laminate is selected from the group consisting of polyethylene, polypropylene, polyvinyl chloride, polyvinylidene chloride, polyethylene terephthalate, cellulose, and polyamides.

9. The flexible laminate of claim 8 wherein at least one of the polymeric films in said flexible laminate is polypropylene.

10. The flexible laminate of claim 9 wherein the acrylic polymer is comprised of from 5 to 25 weight percent styrene or alpha methyl styrene.

11. The flexible laminate of claim 10 wherein the emulsion polymerized acrylic polymer is surfactant stabilized.

12. The flexible laminate of claim 10 wherein the emulsion polymerized acrylic polymer is stabilized by an ammonium salt of a carboxylated styrene resin.

13. The flexible laminate of claim 1 wherein the emulsion polymerized acrylic polymer is stabilized by an aminated styrene resin.

14. The aqueous emulsion polymerized acrylic polymer of claim 5 wherein the amine is dimethylaminopropyl methacrylamide.

15. In an aqueous emulsion polymerized acrylic polymer suited as a laminating vehicle for forming a flexible laminate suited for the packaging of food snacks comprised of thin polymeric films bonded together by the acrylic polymer, the improved acrylic polymer which is comprised of an acrylic polymer having polymerized units of:

(a) from 40 to 65% by weight of acrylate/methacrylate;

(b) from 0 to 50% by weight styrene/α-methylstyrene; and, (c) from 8 to 30% by weight of amino(meth)acrylate or an amino(meth)acrylamide, and furthermore, the acrylic polymer is stabilized by means of a carboxylated styrene resin.

16. The aqueous emulsion polymerized acrylic polymer of claim 15 wherein the acrylic polymer is comprised of polymerized units of from 30% by weight of polymerized units of an amino acrylate selected from the group consisting of diethylaminoethyl acrylate, diethylaminoethyl methacrylate, 2-(dimethylamino)ethyl acrylate, 2-(dimethylamino)ethyl methacrylate, 2-aminoethyl acrylate, 2-aminoethyl methacrylate, 2-methylaminoethyl acrylate and 2-methylaminoethyl methacrylate, 2-(diethylamino)ethyl acrylate, 2-(diethylamino)ethyl methacrylate, tertiary butylaminoethyl methacrylate; 2-N-morpholinoethyl methacrylate and 2-N-morpholinoethyl acrylate, 3-(dimethylamino)-2-hydroxypropyl methacrylate, 3-(diethylamino)-2-hydroxypropyl methacrylate, 3-N-morpholino-2-hydroxypropyl methacrylate, and 3-(diethylamino)-propyl methacrylamide.

17. The aqueous emulsion polymerized acrylic polymer of claim 16 wherein the acrylic polymer is comprised from 5 to 25 weight percent styrene or alpha methyl styrene.

18. The aqueous emulsion polymerized acrylic polymer of claim 17 wherein the acrylic polymer has a Tg of $-50°$ to about $+60°$ C.

* * * * *